United States Patent [19]

Katsura et al.

[11] Patent Number: 4,658,270

[45] Date of Patent: Apr. 14, 1987

[54] RECORDING APPARATUS

[75] Inventors: Hiroo Katsura, Nara; Keiji Yao, Yamatokoriyama; Kazuya Koyama, Ikoma, all of Japan

[73] Assignee: Sharp Kabushiki Kaisha, Osaka, Japan

[21] Appl. No.: 631,729

[22] Filed: Jul. 17, 1984

[30] Foreign Application Priority Data

| | | | |
|---|---|---|---|
| Jul. 27, 1983 | [JP] | Japan | 58-138230 |
| Jul. 27, 1983 | [JP] | Japan | 58-138231 |
| Jul. 27, 1983 | [JP] | Japan | 58-138232 |

[51] Int. Cl.[4] .......................... G01D 15/10; B41J 33/14

[52] U.S. Cl. .............................. 346/76 PH; 400/120; 400/208; 400/236

[58] Field of Search .................. 346/76 PH; 400/120, 400/55, 58, 59, 248, 208, 236

[56] References Cited

U.S. PATENT DOCUMENTS

| | | | |
|---|---|---|---|
| 4,265,551 | 5/1981 | Adamek et al. | 400/221.1 |
| 4,350,452 | 9/1982 | Dials et al. | 400/208 |
| 4,397,576 | 8/1983 | Drejza et al. | 400/320 |
| 4,468,139 | 8/1984 | Hattori | 400/120 |

OTHER PUBLICATIONS

Darwin, "Ribbon Drive", IBM Tech. Disc. Bull., vol. 19, No. 4, pp. 1407-1408, 9-76.

*Primary Examiner*—E. A. Goldberg
*Assistant Examiner*—Gerald E. Preston
*Attorney, Agent, or Firm*—Birch, Stewart, Kolasch & Birch

[57] ABSTRACT

A thermal recording apparatus for recording onto a recording paper comprises a printing head, an ink ribbon member, and a movement member for moving the printing head between a first position in which the printing head is in contact with the recording paper via the ink ribbon member and a second position in which the printing head is not in contact with the recording paper.

15 Claims, 11 Drawing Figures

RECORDING APPARATUS

BACKGROUND OF THE INVENTION

The present invention relates to a recording apparatus and, more particularly, to an improved recording apparatus of the non-impact type which uses a thermal head member.

In the conventional thermal transfer printer having the thermal head member, the ink ribbon member coated by a thermomelting ink material is disposed over the recording paper, and the thermal head member is heated with the desired positions to become in contact with the ink ribbon member so as to record the desired pattern information on the recording paper by melting the ink material of the ink ribbon member.

However, when the desired parttern information is recorded on the recording paper, the thermal head member heated with the desired positions transfers the ink material from the ink ribbon member to the recording paper by being attached more closely, so that the ink ribbon member and the recording paper may be cut off or broken when the thermal head member is released from the recording paper via the ink ribbon member.

Also, because the movement responsive to the recording paper of the thermal head of the recording apparatus is controlled by the solenoid and the crank mechanism, the noise and power-loss are too high, and further, the thermal head may be broken since the thermal head hits hard onto the recording paper via the ink ribbon member.

Further, the ink ribbon member is rolled up by using the rack and the pinion gear when the carriage carrying the ink ribbon member is horizontally slided for printing the desired information onto the recording paper, so that the noise is loudly generated.

SUMMARY OF THE INVENTION

Accordingly, it is an object of the present invention to provide a compact and noiseless recording apparatus with a low power.

It is another object of the present invention to provide an improved recording apparatus in which a printing head such as a thermal head attaches soft to the recording paper via an ink ribbon member so as to record the desired pattern information on a recording paper.

It is still another object of the present invention to provide an improved recording apparatus including a compact ink ribbon reeling mechanism which drives a reel axis of an ink ribbon cassette carrying an ink ribbon for recording with a driving wire of a carriage carrying the ink ribbon cassette.

It is a further object of the present invention to provide an improved recording apparatus which can release an ink ribbon from the recording paper with a small draw power after recording the desired pattern information.

It is still further object of the present invention to provide an improved recording apparatus of the non-impact type which can easily separate each of a printing head, an ink ribbon member, and a recording paper after the recording of the desired pattern information is completed by attaching closely between the recording paper and the printing head via the ink ribbon member.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, a thermal recording apparatus for recording onto a recording paper comprises a printing head, an ink ribbon member, and movement means for moving the printing head between a first position in which the printing head is in contact with the recording paper via the ink ribbon member and a second position in which the printing head is not in contact with the recording paper.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
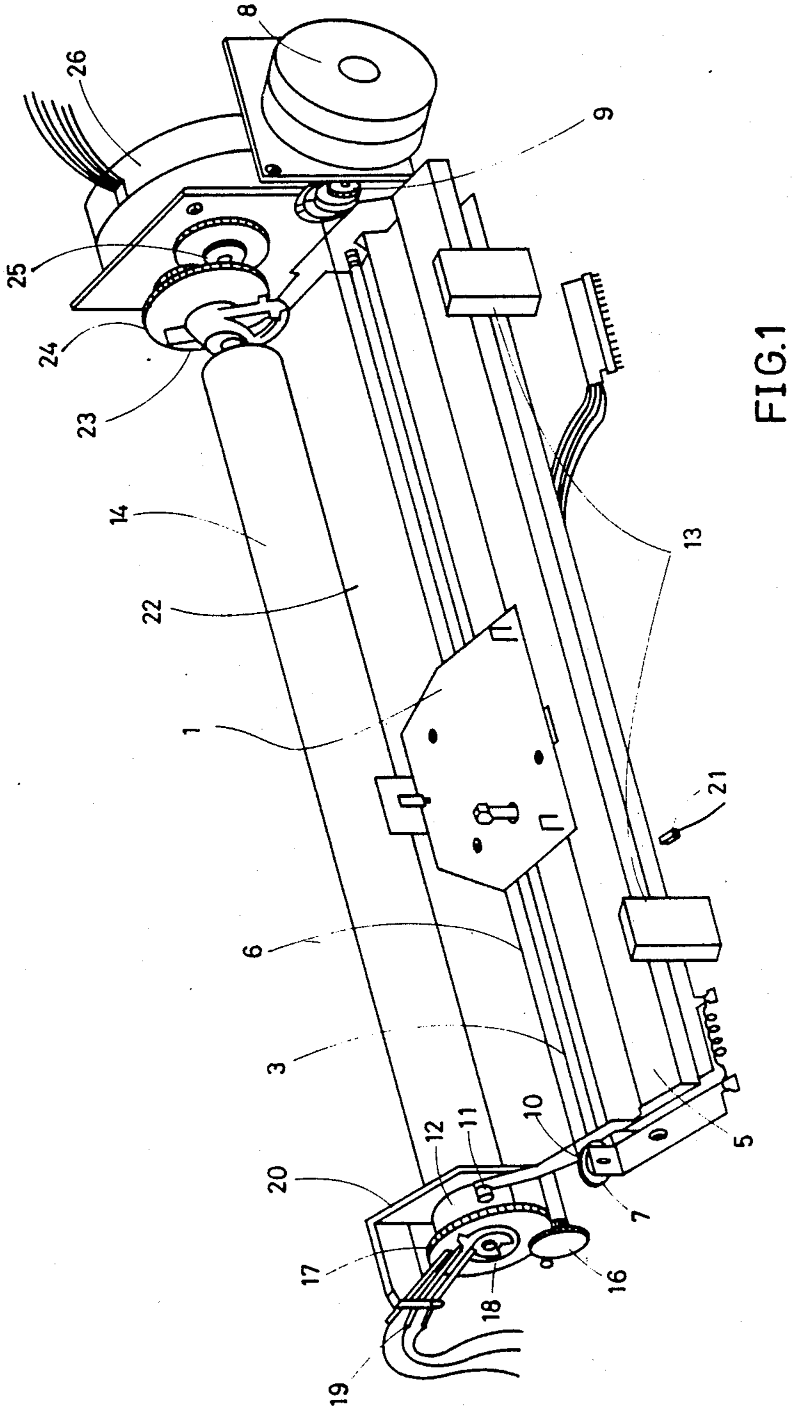
FIG. 1 shows a perspective view of a recording apparatus according to an embodiment of the present invention.

FIG. 1 shows a perspective view of a recording apparatus such as a thermal transfer printer according to an embodiment of the present invention.

A carriage 1 carries a thermal head member and an ink ribbon cassette including an ink ribbon member coated by a thermomelting material. A guide plate 2 (FIG. 6(C)) having an opening is provided at the front and bottom position of the carriage 1. A carriage guide shaft 3 is inserted into the opening of the guide plate 2, so that the carriage 1 is horizontally slid along the carriage guide shaft 3. A groove 4 (FIG. 6(C)) is provided at the back position of the carriage 1, so that one end of a carriage guide plate 5 is inserted into the groove 4 of the carriage 1 for horizontally sliding the carriage 1.

Both ends of a wire 6 for moving the carriage are coupled to the carriage 1, and the wire 6 is extended between a spring-tensioned pulley 7 and a pulley of a carriage driving gear 9 which is driven by a carriage feed motor 8, so that the wire 6 is looped.

The wire 6 is moved in the horizontal direction by driving the motor 8. Further, the wire 6 is rolled by one turn around a pulley 30 (FIG. 6(B)), provided at the bottom position of the carriage 1, for supporting the driving of the ink ribbon reel axis.

Figure 2:
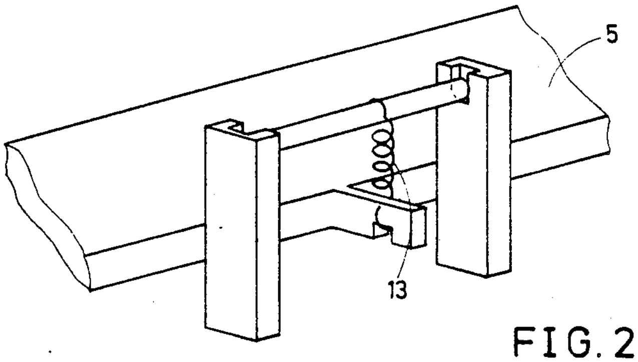
FIG. 2 shows a view of a detailed construction including a spring 13 and a carriage guide plate 5.
Figure 3A:
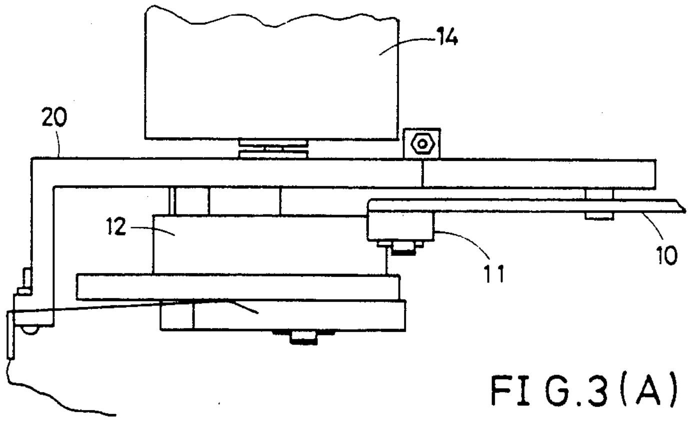
FIGS. 3(A)–3(C) are a plan view, a front view, and a side view of a peripheral mechanism around a cam 12, respectively.
Figure 3B:
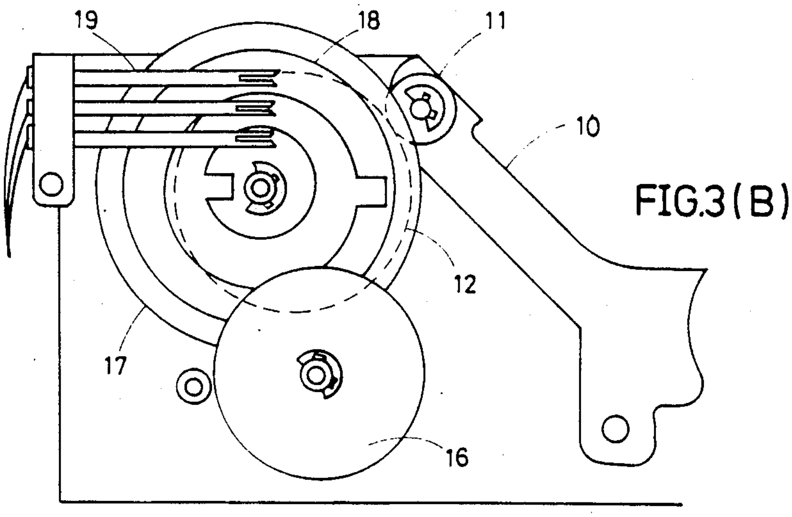
Figure 3C:
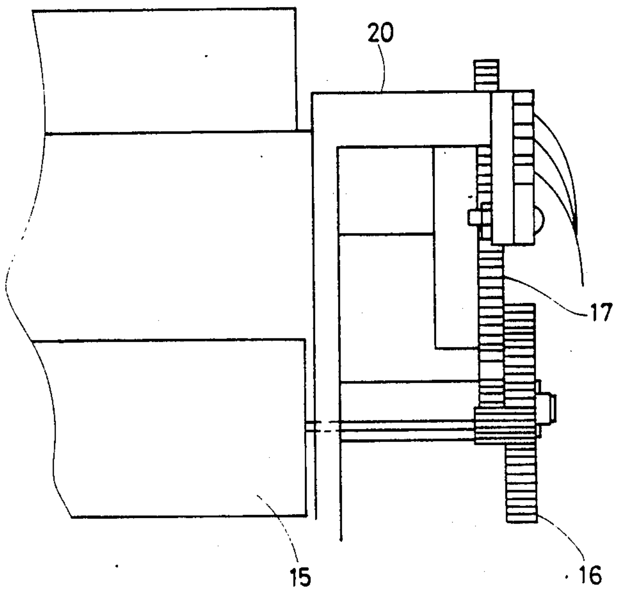

An arm member 10 is integrally formed with the carriage guide plate 5. A roller 11 is provided at one end of the arm member 10, and the roller 11 is in contact around the surface of a cam 12 as described later. The roller 11 is moved along the cam surface of the cam 12 by lifting up in the upper direction the front position of the carriage guide plate 5 with a spring 13 as shown in FIG. 2. The position of the thermal head provided on the carriage 1 is controlled against the platen 14 by the combintion of the cam 12 and the arm member 10, so that the carriage 1 is seesawed with a fulcrum of the shaft 2 in conformance with the shape of the cam 12 and the thermal head is moved in the up and down directions.

The cam 12 is coupled with a gear 17 in the common axis, and the gear 17 is engaged with a gear 16 provided around the rotating axis of a DC motor 15. The cam 12 is rotated with the gear 17. A base 18 is provided on the side surface of the gear 17, and electric conductive patterns for detecting the up and down positions of the thermal head are formed on the surface of the base 18. Three terminals 19 are in contact with the electric conductive patterns so as to take out ON/OFF signals for the DC motor 15, and the three terminals 19 are secured to a "L" shape angle 20.

A detector 21 is operated to detect the positioning of the carriage 1 at its home position (original position). A pinch roller acceptor is designated by 22, and a nob 23 is operated to cancel the seesaw up operation of the thermal head and the operation of the pinch roller.

A gear 24 is provided around the rotating axis of the platen 14 and rotated by the power of a paper feed motor 26 via a gear 25. The gear 24 can be used as a manual paper feed gear.

Figure 4:
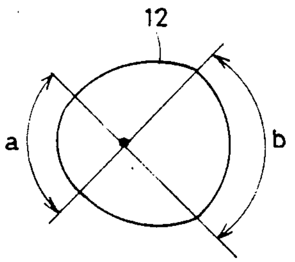
FIG. 4 is a shape of the cam 12.

The cam 12 and its pheripheral mechanisms will be described as follows with reference to FIGS. 3(A)-3(C), 4, and 5(A)-5(B). The shape of the cam 12 is shown in FIG. 4.

The cam 12 has an area a with a minimum radius and an area b with a maximum radius, and the areas a and b are formed as widely as possible. The length of each of the radii is selected to be harmony with the mechanism of the recording apparatus.

Now, when a signal indicating a print timing is applied, the DC motor 15 is driven, and the cam 12 is rotated. When the terminals 19 detect a signal for a head-down operation, the DC motor 15 is stopped driving. In this time, the roller 11 of the arm 10 is positioned at the area a of the cam 12. The arm 10 is rotated in the counterclockwise direction of FIG. 3(B). The front position of the carriage guide plate 5 is lifted up by rotating the arm 10. The carriage 1 is rotated around the carriage guide shaft 3 in the direction of the platen 14, so that the thermal head on the carriage 1 is attached to the recording paper on the platen 14 via the ink ribbon member coated by the thermomelting ink material, and the desired pattern information is printed out on the recording paper by heating the desired positions of the thermal head.

Figure 5A:
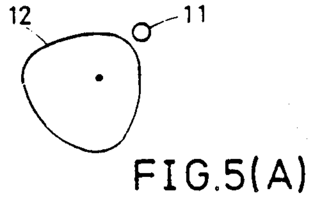
FIGS. 5(A)–5(B) are views of explaining relative positions of a cam and a printing head.

When the desired pattern information is recorded, the roller 11 and the cam 12 are slightly spaced as shown in FIG. 5(A), so that the thermal head is uniformly in contact with the recording paper by the spring 13.

Figure 5B:
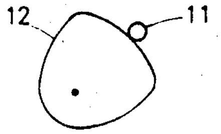

After the recording of one line by moving the carriage 1 in the right direction has been completed in the above manner, a printing completion signal is applied for redriving the DC motor 15. The three terminals 19 detect a signal generated for a head-up operation, and then, the DC motor 8 is stopped driving. In this time, the roller 11 is positioned at the area b of the cam 12 as shown in FIG. 5(B), so that the arm 10 is rotated in the clockwise direction so as to release the thermal head of the carriage 1 from the platen 14 and the recording paper. The head-up operation is carried out and the thermal head is placed in the up position. When the thermal head is in the head-up position, the carriage carrying the thermal head is returned to the original (home) position.

As described above, the head up/down movements are carried out by the cam 12 and the DC motor 15 for dirving the cam 12, so that the noise is smaller than that generated by the solenoid which is used in the conventional printer and the thermal head attaches soft to the recording paper on the platen 14 so as to prevent any damage of the thermal head.

Generally, when a temperature or a load is changed, the motor is slipped from the correct stop position. Accordingly, the motor 15 must be compulsorily stopped so as to stop the cam 12 in the correct stop position.

According to the present invention, the areas a and b of the cam 12 are formed widely in order to reduce the slip from the correct stop position of the motor 15. The over-run from the correct stop position of the motor 15 is absorbed by the area a or b of the cam 12. The mechanism which uses the cam 12 can be simplified than the mechanism which uses the solenoid or the like, and can be controlled with high reliability.

Figure 6A:
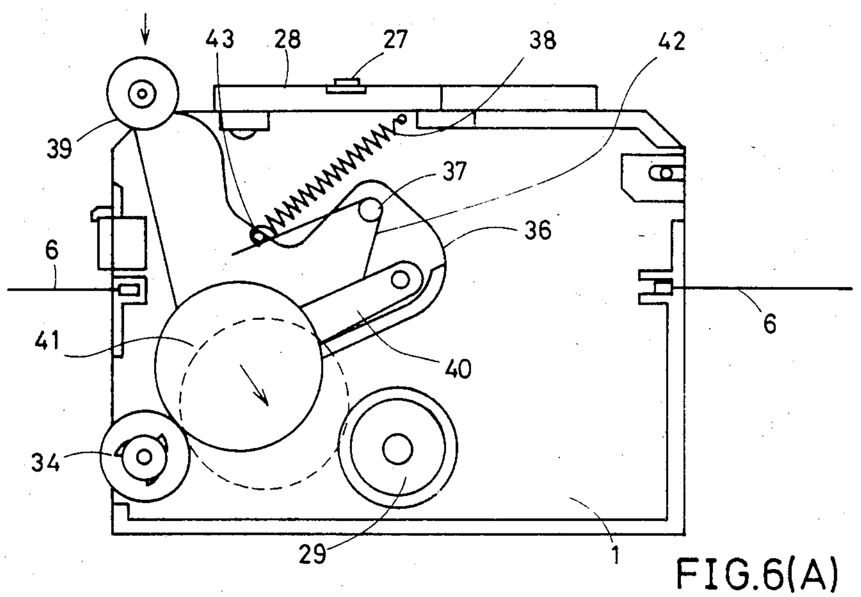
FIGS. 6(A)–6(C) are a plan view, a front view, and a side view of a carriage for use in the recording apparatus of FIG. 1.
Figure 6B:
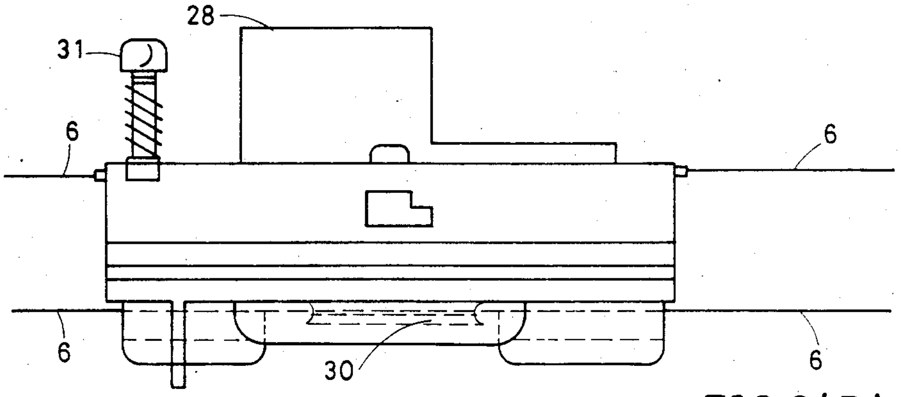
Figure 6:
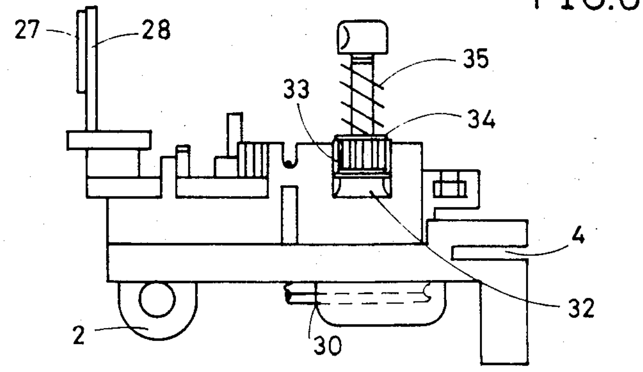

FIGS. 6(A)-6(C) are a plan view, a front view, and a side view of a carriage used in the printer according to the present invention, respectively.

The thermal head is designated by 27, and a heat radiation plate is designated by 28. A gear 29 is rotatably provided on the botton position of the carriage 1. The gear 29 is connected to a pulley 30 via the bottom plate so as to rotate the gear 29 and the pulley 30 at the same time. The wire 6 is rolled by one turn around the pulley 30 as shown in FIG.6(B). When the wire 6 is pulled, the carriage 1 is slided in the horizontally direction, and the pulley 30 is rotated.

When the ink ribbon cassette carrying the ink ribbon member is set into the carriage 1, the ribbon reel axis 31 is inserted into the reel bobbin of the ink ribbon cassette. The ribbon reel axis 31 is rotatably provided at the bottom plate of the carriage 1.

A seat 32 is integrally formed at the bottom portion of the ribbon reel axis 31, and a felt 33 and a gear 34 are inserted onto the ribbon reel axis 31 on the seat 32.

The felt 33 and the gear 34 are pressed by a coil spring 35 in the direction of the seat 32. Accordingly, when the gear 34 is rotated, the ribbon reel axis 31 is rotated by friction thus providing a ribbon member transport mechanism. When a load agaist the ribbon reel axis 31 is larger than a predetermined value, only the gear 34 is rotated by slipping. An "L" shape movable plate 36 is provided on the bottom plate of the carriage 1 and freely rotated around an axis 37. A part of the movable plate 36 provided with a roller 39 is usually projected in the front of the thermal head 27.

One end of a movable bar 40 is rotatably attached to the "L" shape movable plate 36, and the other end of the movable bar 40 has a rotatable gear 41. the movable bar 40 is forced till a stopper 43 of the movable plate 36 in the counterclockwise direction by the spring 42.

The gear 41 is usually separated from the gears 29 and 34. When the roller 39 of the "L" shape movable plate 36 is pressed in the direction of arrow, the gear 41 is positioned so as to engage with the gears 29 and 34 at the same time.

When the gear 41 is returned to the home position by a coil spring 38, the gear 34 is rotated, so that gear 41 is supported a little by friction so as to rotate slightly the ribbon reel axis 31 in the reel direction.

Now, when the carriage 1 is driven down by applying a signal for printing, the roller 39 is in contact with the pinch roller acceptor 22 and is pressed in the arrow direction , and then, the "L" shape movable plate 36 and the movable bar 40 are rotated in the counterclockwise direction. The gear 41 provided with the movable bar 40 is engaged with the gaers 29 and 34. In this condition, the desired pattern information is recorded onto the recording paper by heating the desired positions of the thermal head. By rotating the carriage feed motor 8, the upper positioned wire 6 is pulled in the right direction and the carriage 1 is slid along the guide shaft 3. As shown in FIG. 6(B), the wire 6 of the lower position is moved in the left direction. The pulley 30 is rotated, and the rotation of the pulley 30 is transmitted to the gear 34 via the gears 29 and 41. therefore, the ribbon reel axis 31 engaged frictionaly with the gear 34 is rotated in the reel direction, and finally, the ink ribbon of the ink ribbon cassette is reeled each time the carriage 1 is moved in the right direction for printing. The printing of one line is completed as described above.

When the printing of one line is completed, the printing completion signal is applied and the carriage 1 is seesawed with the fulcrum of the shaft 3 in conformance with the shape of th cam 12 and the thermal head is released from the recording paper via the ink ribbon member, so that the head is raised. The roller 39 is moved in the reverse direction of arrow by the coil spring 38. The gear 41 is released from the gears 29 and 34 and returned to the original (home) position. In this time, although the pulley 30 is rotated, the ribbon reel axis 34 is not rotated because the gear 41 is released from the gear 29 connected to the pulley 30.

The ink ribbon member in the ribbon cassette is reeled by the wire 6 for moving the carriage in the horizontal direction.

When the thermal head is raised, the gear 34 is slightly rotated by the movement for returning of the gear 41, and the ribbon reel axis 31 is rotated in the ribbon reel direction, so that the ribbon member attached strongly to the recording paper by heating and melting the thermomelting ink material can be easily stripped from the recording paper.

The roller 39 is sufficiently pressed by the operation of the movable bar 40 even when the gear 41 is engaged with the gears 29 and 34, so that the thermal head is correctly and closely attached ot the recording paper without a space.

According to the present invention, the ink ribbon reel axis is driven to rotate by the movement of the driving wire of the carriage. Also, the recording apparatus has the cam, the motor for driving motor the cam, and the mechanism for releasing the carriage from the recording paper responsive to the shape of the cam. Further, as soon as the carriage carrying the ink ribbon member is returned to the home position, the ribbon reel axis is further slightly rotated in the ribbon reel direction, so that the ink ribbon can be separated from the recording paper with a smaller pull power.

According to the gist of the present invention, it may not be essential that the carriage is seesawed to move the head. It may be possible that the carriage is relatively moved close to and apart from the recording paper while carrying the head and the ribbon member.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A thermal printing apparatus comprising:

a carriage;

a thermal head on said carriage for making a record on a recording medium in use by the effect of heat on an ink ribbon member;

an ink ribbon transport mechanism rotatably mounted on said carriage and including a ribbon reel axis;

means for moving said thermal head between a first position in which it is pressed against the recording medium and a second position in which it is spaced from the recording medium, and means responsive to movement of said thermal head from said first position to said second position for slightly rotating said ribbon reel axis.

2. A thermal printing apparatus according to claim 1, in which said moving means also provides movement of said carriage between first and second positions corresponding to those of said thermal head.

3. A thermal printing apparatus according to claim 2, in which said movement of said carriage is a seesaw rotational movement.

4. A thermal printing apparatus according to claim 2, in which said carriage carries an ink ribbon member.

5. A thermal printing apparatus according to claim 3, in which said carriage moves in a direction transverse to the direction of movement between said first and second postions, to carry said thermal head between printing locations, and said movement between printing locations drives said ink ribbon member transport mechanism.

6. A thermal printing apparatus according to claim 5, in which said ink ribbon member transport mechanism is driven by a gear turned by a pulley mounted on said carriage and around which is looped a wire used to move said carriage in the transverse direction.

7. A thermal printing apparatus according to claim 6, in which movement of said carriage in the transverse direction between printing locations drives said transport mechanism when said carriage carries said thermal head in said first position but not when said carriage carries said thermal head in said second position.

8. a thermal printing apparatus according to claim 7, in which said pulley drives said transport mechanism through a gear train including a plurality of gears, one of said plurality of gears being movable when said carriage moves to carry said thermal head between said first and second positions, said movable gear being disengaged from said gear train when said carriage is in said second position.

9. A thermal printing apparatus according to claim 4, in which said ink ribbon member carries a thermomelting material.

10. A thermal recording apparatus comprising:

a thermal head;

an ink ribbon member operatively positioned adjacent to said thermal head;

said thermal head engaging said ink ribbon member for making a record on recording medium in use by the effect of heat on said ink ribbon member;

a transport mechanism for said ink ribbon member wherein said transport mechanism is driven by movement of the thermal head between printing locations;

a carriage, wherein the movement of said head results from movement of said carriage carrying said head, said carriage also carrying said ink ribbon member and said transport mechanism;

a pulley mounted on said carriage, wherein said ribbon member transport mechanism is driven by said pulley, a wire used to move the carriage between printing locations is looped around said pulley;

said carriage is moved in use between a first position in which said head is pressed against the recording medium and a second position in which said head is spaced from the recording medium, movement of said carriage between printing locations driving said transport mechanism when said carriage is in said first position but not when said carriage is in said second position;

said pulley drives said transport mechanism through a gear train including a plurality of gears, one of said plurality of gears being movable when said carriage moves between said first and second positions, said movable gear being disengaged from said gear train when said carriage is in said second position and said movable gear is mounted on a movable member resiliently urged towards a position in which said movable gear is disengaged from said gear train, when said carriage is in said first position a contact piece on said carriage contacts a stationary member not mounted on said carriage for holding said movable member out of the biased position so that said movable gear completes the gear train.

11. A thermal printing apparatus comprising;

a thermal head for making a record on a recording medium in use by the effect of heat on an ink ribbon member;

said head being moved in use between a first position in which it is pressed against the recording medium and a second position in which it is spaced from the recording medium;

a transport mechanism for the ink ribbon member which transport mechanism is driven by movement of said thermal head from said first position to said second position, said movement results from movement of a carriage carrying said thermal head;

said movement of said carriage is a seesaw rotational movement;

said carriage moves in a direction transverse to the direction of movement between said first and second positions, to carry said thermal head between printing locations;

said movement between printing locations drives said ink ribbon member transport mechanism;

said ink ribbon member transport mechanism is driven by a gear turned by a pulley mounted on said carriage and a wire used to mvoe said carriage in the transverse direction is looped around said pulley;

movement of said carriage in the transverse direction between printing locations drives said transport mechanism when said carriage carries said thermal head in said first position but not when said carriage carries said thermal head in said second position;

said pulley drives said transport mechanism through a gear train including a plurality of gears, one of said plurality of gears being movable when said carriage moves to carry said thermal head between said first and second positions.

said movable gear being disengaged from said gear train when said carriage is in said second position, and said gear is mounted on a movable member which is resiliently urged towards a position in which the movable gear is disengaged from the gear train, when the carriage is in its first position a contact piece on the carriage contacts a stationary member not mounted on the carriage for holding said movable member out of the biased position so that said movable gear completes the gear train.

12. A thermal printing apparatus according to claim 11, in which movement of said movable gear disengaging from said gear train as said carriage moves to carry said thermal head from said first position to said second position effects the driving of said transport mechanism by movement of said thermal head from said first position to said second position.

13. A thermal recording apparatus comprising:

a carriage;

a thermal head on said carriage;

an ink ribbon transport mechanism on said carriage and operatively positioned adjacent to said thermal head;

said thermal head engaging an ink ribbon member for making a record on a recording medium in use by the effect of heat on said ink ribbon member;

wire means connected to said carriage for moving said carriage between printing locations;

a pulley mounted on said carriage and connected to drive said ink ribbon transport mechanism, and said wire means including a wire which is looped around said pulley.

14. A thermal printing apparatus according to claim 13 wherein said carriage is moved in use between a first position in which said head is pressed against the recording medium and a second position in which said head is spaced from the recording medium, movement of said carriage between printing locations driving said transport mechanism when said carriage is in said first position but not when said carriage is in said second position.

15. A thermal printing apparatus according to claim 14, wherein said pulley drives said transport mechanism through a gear train including a plurality of gears, one of said plurality of gears being movable when said carriage moves between said first and second positions, said movable gear being disengaged from said gear train when said carriage in in said second position.

* * * * *